United States Patent
Zhang et al.

(10) Patent No.: US 10,154,086 B1
(45) Date of Patent: Dec. 11, 2018

(54) DISTRIBUTED CONSUMER CLOUD STORAGE SYSTEM

(71) Applicant: EMC Corporation, Hopkinton, MA (US)

(72) Inventors: Feng Zhang, Sherborn, MA (US); Zongliang Li, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 35 days.

(21) Appl. No.: 15/228,544

(22) Filed: Aug. 4, 2016

Related U.S. Application Data (63) Continuation of application No. 12/977,906, filed on Dec. 23, 2010, now Pat. No. 9,442,671.

(51) Int. Cl.
    *H04L 29/08* (2006.01)
(52) U.S. Cl.
    CPC ........ *H04L 67/104* (2013.01); *H04L 67/1097* (2013.01)
(58) Field of Classification Search
    CPC .................. H04L 67/104; H04L 67/1097
    See application file for complete search history.

(56) References Cited

U.S. PATENT DOCUMENTS

| | | | | |
|---|---|---|---|---|
| 6,151,659 A * | 11/2000 | Solomon | ............... | G06F 3/0622 710/200 |
| 6,523,078 B1 * | 2/2003 | Desai | ............... | G06F 9/526 710/200 |
| 6,826,711 B2 * | 11/2004 | Moulton | ............... | G06F 11/1076 711/114 |
| 7,386,610 B1 * | 6/2008 | Vekiarides | ............... | G06F 11/2071 709/213 |
| 2002/0156984 A1 * | 10/2002 | Padovano | ............... | G06F 11/1441 711/143 |
| 2003/0041211 A1 * | 2/2003 | Merkey | ............... | G06F 11/1076 711/114 |
| 2005/0188283 A1 * | 8/2005 | Pomaranski | ............... | H04L 43/0811 714/47.2 |

* cited by examiner

*Primary Examiner* — Robert B Leung
*Assistant Examiner* — Thomas Ho
(74) *Attorney, Agent, or Firm* — Krishnendu Gupta (57) ABSTRACT

Example embodiments of the present invention relate to a method, a system, and a computer program product for data recovery from an unavailable peer node of a plurality of peer nodes in a network detected as unavailable. The method includes recovering from neighboring peer nodes of the plurality of peer nodes in the network neighboring the unavailable peer node a fragment of a data object distributively stored to the unavailable peer node.

21 Claims, 7 Drawing Sheets

DISTRIBUTED CONSUMER CLOUD STORAGE SYSTEM

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This application relates to distributively storing a data object to a logical storage group in a network.

BACKGROUND

Storage is a fundamental commodity of computation. Distributed storage mechanisms are becoming the de-facto method of data storage for the new generation of applications. The new generation of applications requires processing of terabytes and even petabytes of data. This is achieved by distributed processing. However, distributed storage systems suffer from low data transfer bandwidths and high access latencies. Various attributes, including cost, persistence, bandwidth, and latency, are traditional metrics for storage systems. However, the remarkable growth of communications and networking over has complicated what, traditionally, was a simple evaluation.

SUMMARY

Example embodiments of the present invention relate to a method, a system, and a computer program product for data recovery from an unavailable peer node of a plurality of peer nodes in a network detected as unavailable. The method includes recovering from neighboring peer nodes of the plurality of peer nodes in the network neighboring the unavailable peer node a fragment of a data object distributively stored to the unavailable peer node.

BRIEF DESCRIPTION OF THE DRAWINGS

The above and further advantages of the present invention may be better under stood by referring to the following description taken into conjunction with the accompanying drawings in which.

DETAILED DESCRIPTION

Figure 1:
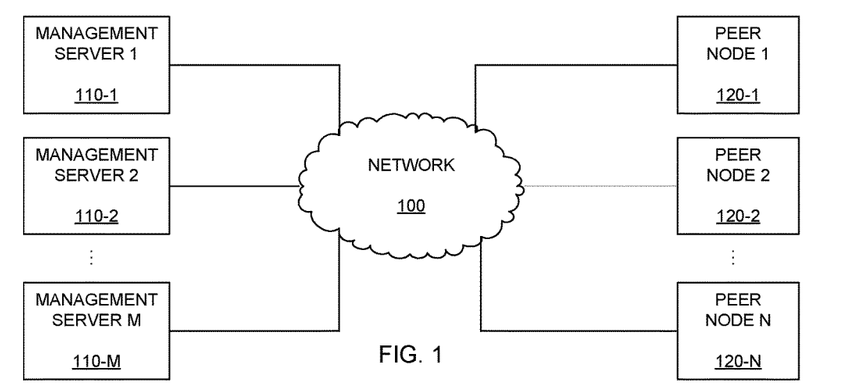
FIG. 1 is a block diagram illustrating an example distributed network environment in which example embodiments of the present invention may be employed.

FIG. 1 is a block diagram illustrating an example distributed network environment in which example embodiments of the present invention may be employed. The example environment includes a plurality of management servers 110-1-110-M (110, generally) and a plurality of peer nodes 120-1-120-N (120, generally) connected by a network 100. The peer nodes 120 may include consumer storage, such as personal computers and gaming consoles.

Figure 2:
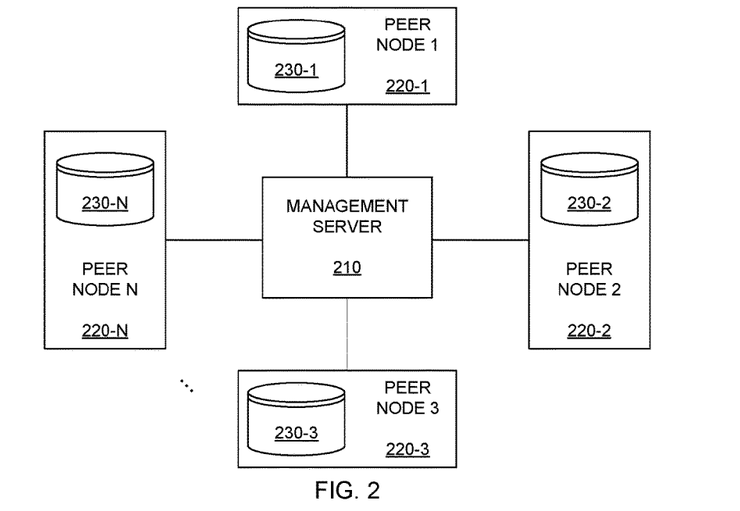
FIG. 2 is a block diagram illustrating an example embodiment of the present invention for providing a framework for intelligently creating logical storage in a distributed network environment.

FIG. 2 is a block diagram illustrating an example embodiment of the present invention for providing a framework for intelligently creating logical storage in a distributed network environment. In a managed peer-to-peer storage network, effective integration of intelligence into the creation of storage groups, including space contributions from a plurality of nodes in the network, is extremely important. The framework includes a management server 210 that may be connected to and manage a plurality of peer nodes 220-1-220-N (220, generally) (e.g., peer nodes 110 of FIG. 1). Each respective peer node 220 may include storage devices 230-1-230-N (230, generally).

Each peer node 220 connects to the management server 210 in a star topology. In a preferred embodiment, the connection between each peer node 220 and the management server 210 is a persistent connection so that the management server 210 knows whether a particular peer node 220 goes offline. In other embodiments a heartbeat signal could be used to determine whether a peer node 220 goes offline.

As understood in the art, a source peer node 220 may establish a connection with the management server 210 to initiate a handshake with a target peer node 220 to establish a peer-to-peer connection for data transfer. The management server 210 then continues to manage the connections between the peer nodes 230. In a preferred embodiment, each peer node 220 may be located behind a network address translation (NAT) device. Accordingly, in such situations, the management server 210 facilitates peer-to-peer communications through the NAT devices (i.e., hold punching) to enable a handshake between peer nodes.

Creating a Logical Storage Group

Figure 3:
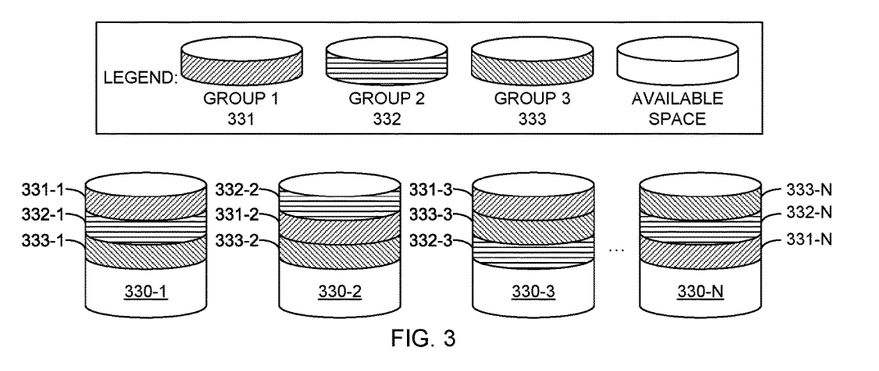
FIG. 3 is a block diagram illustrating a plurality of storage nodes.

FIG. 3 is a block diagram illustrating a plurality of storage devices 330-1-330-N (330, generally) (e.g., storage device 230 at peer node 220 of FIG. 2). Portions of available storage at the storage devices 330 may be allocated as a plurality of respective units 331-1-331-N, 332-1-332-N, 333-1-333-N (331-1-333-N, generally). Units 331-1-333-N allocated at each respective storage device 330 may be assigned together to form a logical storage group (denoted using respective shading in FIG. 3).

Referring to FIGS. 2 and 3 together, in order to determine what peer nodes should be selected for forming a logical storage group, a management server (e.g., management server 210 of FIG. 2) may monitor various metrics of the peer nodes 220. For example, the management server 210 may monitor, at each respective peer node 220, various criteria, including:

Node storage consumption—The selection process will prefer nodes with low usages (i.e., greater amounts of available storage). This helps distribute data and bandwidth workload evenly across the network;

Node storage consumption rate—The selection process not only monitors the storage usage but also the growth rate of the storage usage to distribute data and bandwidth workload evenly across the network;

Node stability tiers—The management server categorizes nodes in several tiers based on their stability (i.e., churn time, churn frequency and average online time). This allows the selection process create groups based on several strategies including grouping all highly stable nodes and grouping nodes with mixed stability. This provides improved storage efficiency;

Node locality—The selection process will meet objectives for both performance and reliability. Performance of a data object is improved if fragments are located close to the consumer. Reliability of a data object is improved if the system disperses the fragments as wide as possible;

Node security/trust level—This allows the system to create groups with only nodes that have an established trust level, as determined, for example, by a token;

Node usage pattern—This allows the system to match data consumption pattern with a particular node's usage pattern. This will improves network efficiency and node response time;

Node software version—This allows the system to form logical storage groups that offer features that are only available from certain nodes. Further, it allows the system of select nodes having varying software version so that, for example, if a particular software version is faulty, the data object may be recovered from the remaining nodes; and Node hardware capability—This allows the system to form groups that offer features that depends on the node's hardware configuration.

The management server 210 then may assign storage units 331-1-333-N at the peer nodes 220 to logical storage groups according to the various metrics. For example, the management server 210 may prefer peer nodes 220 with low storage consumption over peer nodes 220 with high storage consumption, thereby distributing storage across the peer nodes 220 to reduce the chances of a particular peer node 220 being overly burdened. Likewise, the management server 210 may prefer peer nodes 220 with low storage consumption rates over peer nodes 220 with high storage consumption rates. Moreover, the management server 210 may match peer node consumption rates with peer node usage patterns to improve network efficiency and response time.

Further, the management server 210 may prefer peer nodes 220 with a favorable security metric. In this manner, the management server 210 may be able to guarantee to a user that a logical group assigned to peer nodes 220 with the favorable security metric will maintain a certain level of security while storing the fragments comprising the user's data objects, as will be described below. Similarly, the management server 210 may group peer nodes 220 in one of a plurality of tiers based on peer node stability to provide various levels of service to users according to a service level agreement.

Logical storage groups 331, 332, 333 may be created as need arises and from new peer nodes 220 as they become available in the network. Further, the load carried by a particular peer node 220 may be rebalanced at the cost of bandwidth and processing resources. In a preferred embodiment, peer nodes 220 having unfavorable metrics are avoided to avert the network transfers and calculations necessary for recovery should a node fail, become unavailable, or perform poorly for any other reason.

Distributively Storing a Data Object

Figure 4A:
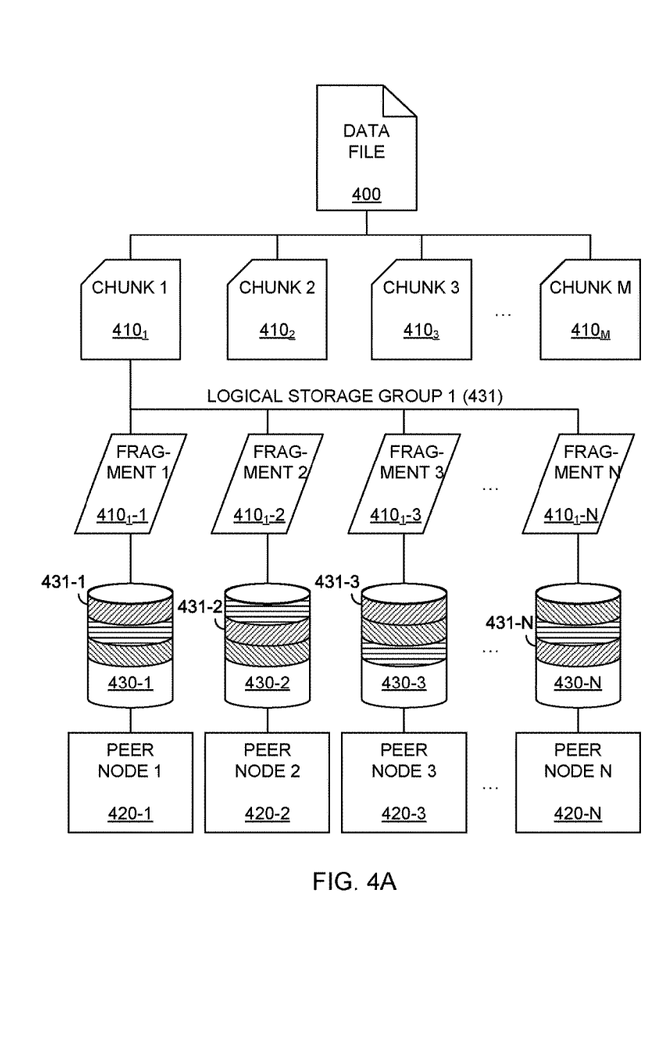
FIGS. 4A-4B are logical block diagrams illustrating an example method for distributively storing a data object.
Figure 4B:
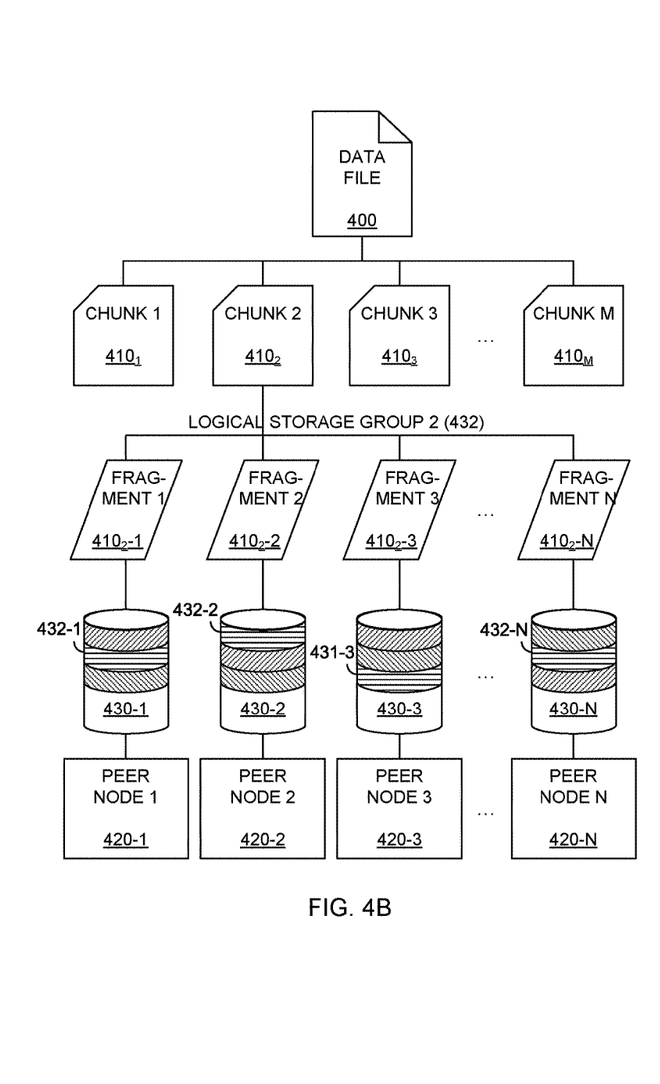

FIGS. 4A-4B are logical block diagrams illustrating an example method for distributively storing a data object 400. A data object 400 may be divided by a client peer node (e.g., peer node 220 of FIG. 2 distributively storing a data object to the plurality of peer nodes) into a plurality of chunks $410_1$-$410_M$ (410, generally). Each respective chunk 410 then may be assigned by a management server to a logical storage group 431, 432, 433 and encoded as a plurality of fragments 410-1-410-N by the client node. The fragments 410-1-410-N then may be stored by the client node to respective units 431-1-431-N, 432-1-432-N, 433-1-433-N of the storage nodes 430-1-430-N at their respective peer nodes 420-1-420-N.

For example, as illustrated in FIG. 4A, a data object 400 may be divided into a plurality of chunks $410_1$-$410_M$. A first chunk $410_1$ may be encoded as a plurality of fragments $410_1$-1-$410_1$-N. The plurality of fragments $410_1$-1-$410_1$-N comprising the first chunk $410_1$ may then stored to a respective logical storage group 431. As described above, the logical storage group 431 may be created by a management server (e.g., management server 210 of FIG. 2) and comprises a plurality of storage units 431-1-431-N. The storage units 431-1-431-N are assigned to the logical storage group 431 from storage allocated at a plurality of storage devices 430-1-430-N at a plurality of respective peer nodes 420-1-420-N managed by the management server.

Likewise, as illustrated in FIG. 4B, a second chunk $410_2$ may be encoded as a plurality of fragments $410_2$-1-$410_2$-N. The plurality of fragments $410_2$-1-$410_2$-N comprising the second chunk $410_2$ then may be stored to a respective logical storage group 432. As illustrated, the logical storage group 432 comprises storage units 432-1-432-N assigned to the logical storage group 432 and allocated at a plurality of storage devices 430-1-430-N at a plurality of respective peer nodes 420-1-420-N.

Mapping Fragments to Time Offsets in a Media File

Traditionally, video files are stored according to a mapping of time offsets to file locations in a directory structure or according to a hierarchical structure including chapters, scenes and frames. The hierarchical and directory tree structures allow a service to narrow down from the whole video to individual scenes and frames.

Distributively storing fragments of a file, however, as described above with respect to FIGS. 4A-4B, provides a number of advantages over traditional storage methods. For example, meeting a user's expectation in serving a video request in a video on demand (VOD) system is critical. However, in traditional VOD systems, entire files must be transferred to the user and directory structures traversed for playback. Therefore, waiting for a sufficient amount of a video file to download or for that segment to be located to begin playback at a desired location in the video file (i.e., seek time) detracts from the user experience.

Example embodiments of the present invention, however, are able to improve video seek time by providing a mapping of video file time offsets to chunks distributively stored in the network. The offset information may be stored by the management server in a table, which may store the data in XML format and as part of the metadata of original video file. Additionally, less metadata is generated by the coarse mapping of video offset times to video file chunks than in traditional video file structures. In alternate embodiments, the mapping of video file time offsets may be to the fragments, with a calculation performed to determine from which chunk the fragment was derived. The As described above with respect to FIGS. 4A-4B, the video file is divided into a plurality of chunks, with each respective chunk coded into a plurality of fragments that are distributively stored to the peer nodes. Using the mapping, the management server keeps records of the video file time offset to chunk mapping. Given an offset request (i.e., seek), the management server looks up the chunk in which the offset may be found. It should be noted that the seek granularity is determined by the chunk size. For example, for a received offset value, the management server would return a chunk according to the mapping in the table. The management server will then support the user downloading the video file with the returned chunk, with a high priority, so the user does not have to download the entire video file in order to begin playback at the desired offset.

Storing Fragment Pairs at Nodes

Figure 5A:
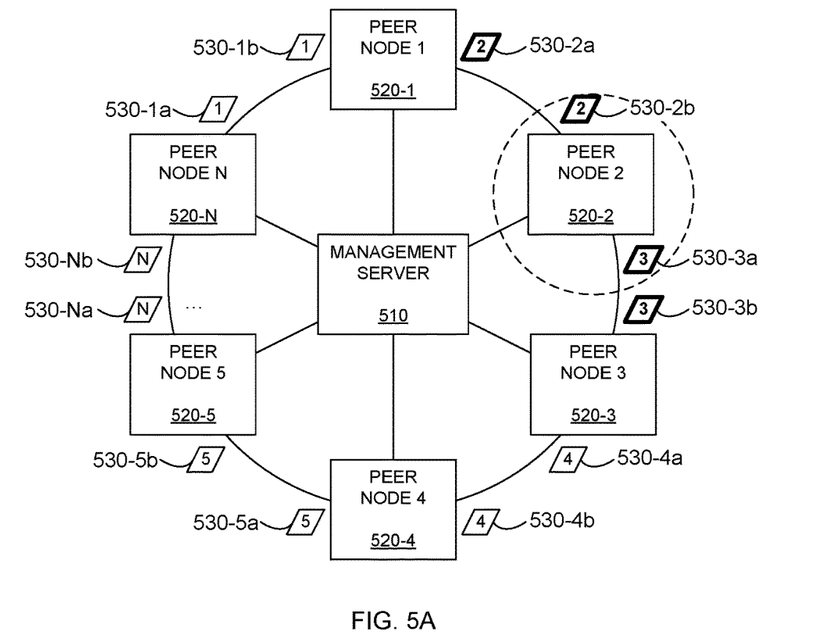
FIGS. 5A-5B are block diagrams illustrating a logical storage group of N peer nodes in a ring topology managed by a management server and recovery in a single node-type failure.
Figure 5B:
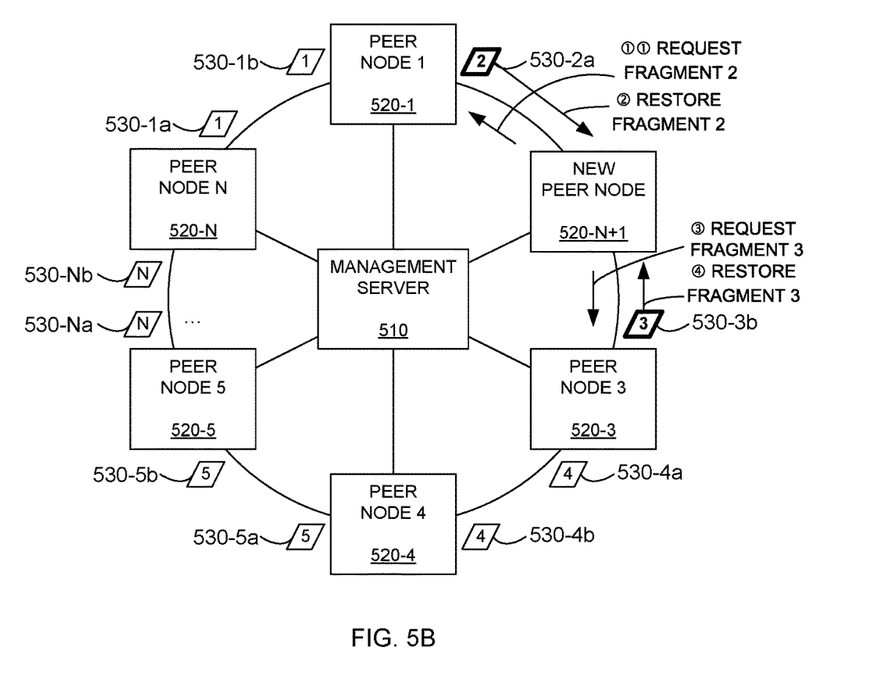

FIGS. 5A-5B are block diagrams illustrating a logical storage group of N peer nodes 520-1-520-N (520, generally) in a ring topology managed by a management server 510. It should be clear to one of ordinary skill in the art that the lines connecting the peer nodes 520 and the management server 510 do not necessarily represent physical connections between the peer nodes 520 or between the peer nodes 520 and the management server 510 but rather represent logical connections.

FIG. 5A is a block diagram illustrating an example method by which the fragments (e.g., fragments 410 of FIGS. 4A-4B) may be coded to the peer nodes 520. As illustrated in FIG. 5A, fragments 530-1*a*-530-N*b* are stored as pairs in a duplication pattern in a ring topology. A data object (e.g., a chunk 410 of FIG. 4) may be encoded into N=K+M pieces, such that any K fragments together can be used to reconstruct the original object.

For example, peer node 1 520-1 may store fragment 1 530-1*b* and fragment 2 530-2*a*, peer node 2 may store fragment 2 530-2*b* and fragment 3 530-3*a*, peer node 3 may store fragment 3 530-3*b* and fragment 4 530-4*a*, peer node 4 may store fragment 4 530-4*b* and fragment 5 530-5*a*, peer node 5 may store fragment 5 530-5*b* and fragment N 530-N*a*, and peer node N may store fragment N 530-N*b* and fragment 1 530-1*a*.

Recovery in a Signal Node Failure

As illustrated in FIG. 5A, peer node 2 520-2 is detected by the management server 510 as unavailable in the network, as indicated by the hashed circle around peer node 2 520-2. For example, peer node 2 520-2 may be unavailable due to temporary node churn, which is extremely common. As will be described below with respect to FIG. 5B, the duplication pattern used to store the fragments in the ring topology allows the fragments stored at peer node 2 520-2, which is now unavailable, to be recovered from neighboring nodes (i.e., peer node 1 520-1 and peer node 3 520-3) storing the fragments (e.g., fragment 2 530-2*a* and fragment 3 530-3*b*.

FIG. 5B is a block diagram illustrating an example method by which fragments may be recovered in a single node-type failure. As described above with respect to FIG. 5A, a peer node (e.g., peer node 2 520-2 of FIG. 5A) has become unavailable, for example, because of temporary node churn. As illustrated in FIG. 5B, the management server 510 may select a new peer node 520-N+1 as part of the logical storage group of N nodes. As described above with respect to FIG. 5A, the fragments previously stored by the unavailable peer node (e.g., fragment 2 530-2*b* and fragment 3 530-3*a* stored at peer node 520-2) are no longer available because of the unavailability of the peer node. However, because of the duplication pattern used to store the fragments, equivalent fragments (e.g., fragment 2 530-2*a* and fragment 3 530-3*b*) may be recovered from nodes neighboring the unavailable node (e.g., peer node 1 520-1 and peer node 3 520-3) and stored to the new peer node 520-N+1.

Accordingly, the management server 510 may establish peer-to-peer connections between the new peer node 520-N+1 and the respective neighboring peer nodes 520-1, 520-3. Once the peer-to-peer connections are established between the new peer node 520-N+1 and its neighboring peer nodes 520-1, 520-3, recovery may begin. For example, the new peer node 520-N+1 may request fragment 2 530-2*a* from peer node 1 520-1, which may then restore fragment 2 530-2*a* to the new peer node 520-N+1. Likewise, the new peer node 520-N+1 may request fragment 3 530-3*b* from peer node 3 520-3, which may then restore fragment 3 530-3*b* to the new peer node 520-N+1. Thus, a node may be recovered through only two network transactions.

This significantly reduces network traffic and processing overhead in comparison to traditional information dispersal methods. Traditionally, an object may be encoded to n=k+m fragments, when any k fragments out of the n fragments can be used to reconstruct the original object. To maintain the reliability level of the original object, the system has to repair the failed fragment. If node x fails, the system has to reconstruct the original object and regenerate fragment x stored at node x. This causes k−1 network transactions to retrieve the fragments necessary to reconstruct the original object and k−1 computations (i.e., decoding) to regenerate fragment x. For example, if a data object is divided into sixty fragments, thirty of which are required for recovery, a great amount of network and processing resources are needed to perform the recovery. However, in example embodiments of the present invention, only two network transactions are needed to recover the fragments stored at the unavailable node, with no computation required.

It should be noted that recovery of a node from neighboring nodes does not require that the underlying stored data object be a fragment stored in a unit. One of ordinary skill in the art will appreciate that any type of distributed storage may be used in which the portion of the data object stored at a failed node may be recovered from neighboring nodes.

Failure of one node (i.e., due to node churn) is statistically very likely. Less likely is the chance that multiple nodes fail, such as by node churn. However, this recovery method remains available for multiple-node failures as long as neighboring nodes do not fail.

Recovery in a Plurality Neighboring Node Failures

Even less likely is a scenario in which neighboring nodes fail. In such a situation, the recovery method described above with respect to FIGS. 5A-5B fails. However, traditional methods of recovery still may be used.

Figure 6A:
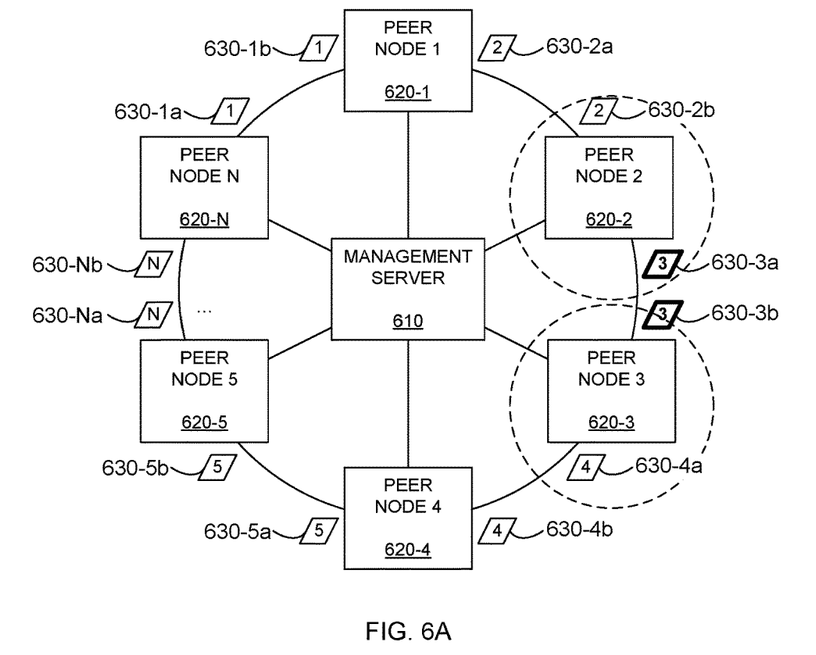
FIGS. 6A-6B are block diagrams illustrating a logical storage group of N peer nodes in a ring topology managed by a management server and recovery in a neighboring nodes-type failure.
Figure 6B:
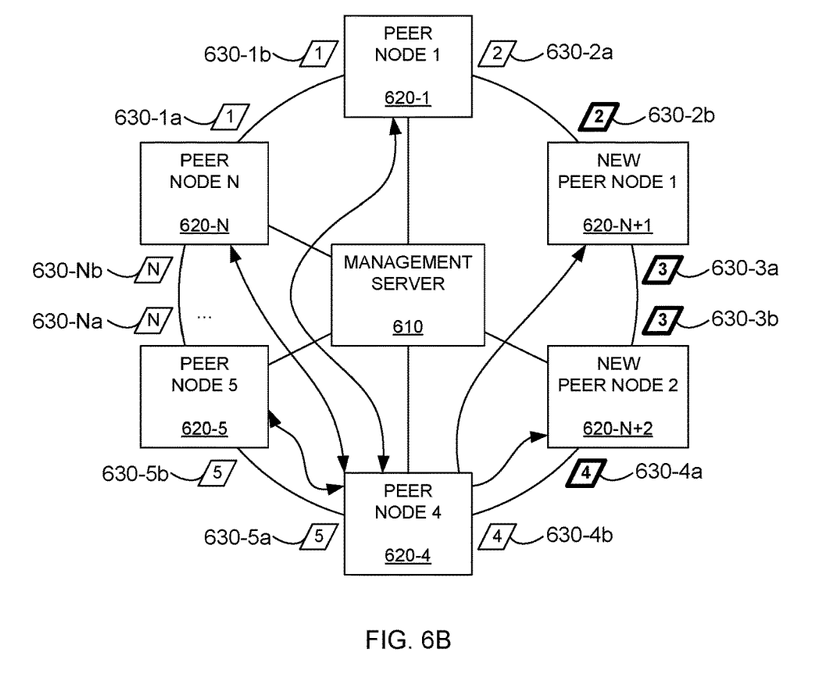

FIGS. 6A-6B are block diagrams illustrating a logical storage group of N peer nodes 620-1-620-N (620, generally)

in a ring topology managed by a management server 610. It should be clear to one of ordinary skill in the art that the lines connecting the peer nodes 620 and the management server 610 do not necessarily represent physical connections between the peer nodes 620 or between the peer nodes 620 and the management server 610 but rather represent logical connections.

FIG. 6A is a block diagram illustrating an example method by which the fragments (e.g., fragments 410 of FIGS. 4A-4B) may be coded to the peer nodes 620. As illustrated in FIG. 6A, fragments are stored in a duplication pattern in a ring topology consistent with the storage method illustrated in FIG. 5A. However, as illustrated in FIG. 6A, neighboring peer node 2 620-2 and peer node 4 620-3 are detected by the management server 610 as unavailable in the network, as indicated by the hashed circles around peer node 2 620-2 and peer node 3 620-3. For example, peer node 2 620-2 and peer node 3 620-3 may be unavailable due to temporary node churn.

In contrast to FIG. 5B, the fragments stored at peer node 2 620-2 and peer node 3 620-3 cannot be recovered from their neighboring nodes (e.g., peer node 1 620-1 and peer node 4 620-4) because there is no node remaining in the logical storage group that stores fragment 3 630-3.

FIG. 6B is a block diagram illustrating an example method by which fragments may be recovered. As described above with respect to FIG. 6A, neighboring peer nodes (e.g., peer node 2 620-2 and peer node 3 620-3 of FIG. 6A) have become unavailable, for example, because of temporary node churn. As illustrated in FIG. 6B, the management server 610 may select new peer node 1 620-N+1 and new peer node 2 620-N+2 as part of the logical storage group of N nodes. As described above with respect to FIG. 6A, a fragment previously stored by the unavailable nodes (e.g., fragment 3 630-3a. 630-3b) is no longer available because of the unavailability of the neighboring peer nodes.

Accordingly, the management server 610 may select a peer node (e.g., peer node 1 620-1, peer node 4 620-4, peer node 5 620-5 or peer node n 620-N) to coordinate recovery of the unavailable fragment (e.g., fragment 3 630-3). For example, as illustrated in FIG. 6B, the management server 610 has selected peer node 4 620-4 as a coordinating peer node to recover fragment 3 630-3. The management server 610 may establish peer-to-peer connections between the other peer nodes 620-1, 620-5, 620-N and the coordinating peer node 4 620-4. Once the peer-to-peer connections are established between the coordinating peer node 4 620-4 and the other peer nodes 620-1, 620-5, 620-N, the coordinating peer node 620-4 may request fragments from the other peer nodes 620-1, 620-5, 620-N.

For example, as described above with respect to FIG. 5A, the fragments 630 may be coded to the peer nodes 620 in such a manner that only a fraction of the fragments are required to recreate the original data object. Thus, a reduced number of fragments (i.e., fewer than all N fragments) need to be gathered by the coordinating peer node 4 620-4 to recreate the original data object (e.g., data object 400 of FIG. 4) and calculate the unavailable fragments (e.g., fragment 2 630-2b, fragment 3 630-3a, 630-3b and fragment 4 630-4a).

For example, as illustrated in FIG. 6B, suppose the fragments 630 are coded to the peer nodes 620 in such a way that only four of the fragments 630 are needed to recreate the original data object. The coordinating peer node (e.g., peer node 4 620-4) only needs to gather four fragments to recreate the original data object and calculate the unavailable fragments. Thus, as illustrated in FIG. 6B, the coordinating peer node 620-4 may request fragment 1 630-1b from peer node 1 620-1, fragment 630-5b from peer node 5 620-5 and fragment N 630-Nb from peer node N 620-N. Note that the coordinating peer node, here peer node 4 620-4, already has at least one fragment (e.g., fragment 4 630-4b) available to it.

Once the coordinating peer node 4 620-4 has received the requisite number of fragments needed to recreate the original data object (as determined by the coding used in storing the fragments to the peer nodes), the coordinating peer node 4 620-4 may then recreate the original data object and divide the original data object into new fragments. Those new fragments then may be stored to the peer nodes 620. Thus, a plurality of neighboring peer nodes may be recovered through a reduced number of network transactions, as determined by the coding used in storing the fragments to the peer nodes, thereby significantly reducing network traffic and processing overhead resulting from traditional methods.

However, as illustrated above with respect to FIG. 5A, the chance of having to consume network and processing resources to perform such a recovery are reduced by storing fragment pairs at each node, thereby providing the ability to recover a node from neighboring nodes in a single node or, more specifically, a non-neighboring node failure scenario.

Geo-Distribution

A high degree of similarity of physical- and performance-based metrics among the fragments of a data object can reduce the reliability of the original data object. Therefore, when a logical storage group is formed, it is advantageous to ensure that the nodes storing the units of the logical storage group are geographically distributed. For example, if a disaster were to strike a particular geographic area in which a number of peer nodes are located, it is desirable to limit the number of fragments that may become unavailable because recovery of those nodes may be difficult or impossible.

To reduce such risk, for a data object divided into N fragments, the management server may divide the N fragments into multiple groups, with the fragments of each group being stored at peer nodes in a particular geographic area. Further, in a preferred embodiment, the size of the group may be as close to K as possible (where K is the number of fragments needed to restore the original data object).

Figure 7:
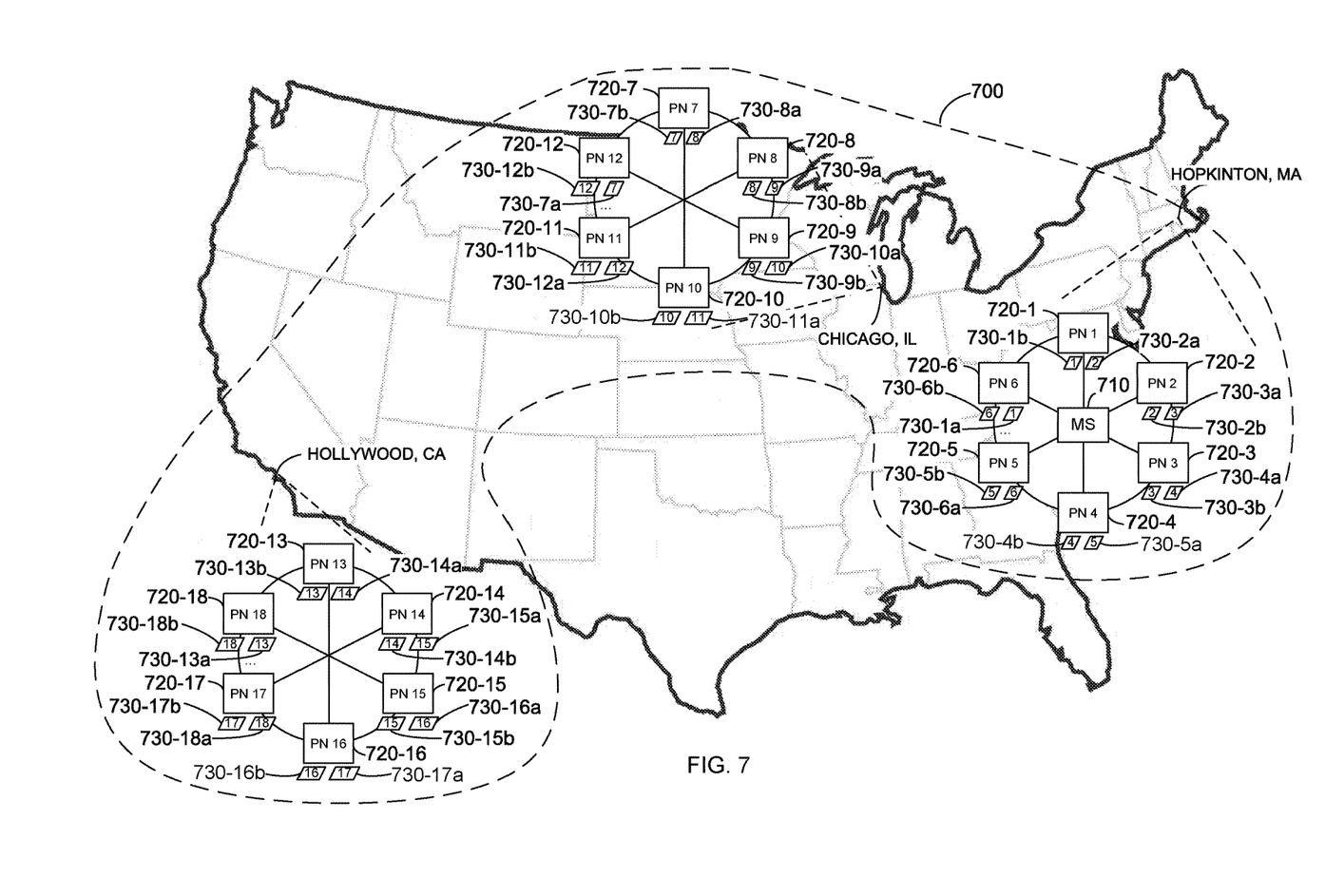
FIG. 7 is a diagram illustrating the geographic distribution of peer nodes.

As illustrated in FIG. 7, for example, presume a data object is encoded to eighteen fragments and six fragments are needed to reconstruct the data object. A logical storage group 700 for storing the eighteen fragments 730-1a-730-18b may include six peer nodes (PNs) in Hopkinton, Mass. (i.e., PN 1 720-1 through PN 6 720-6), six peer nodes in Chicago, Ill. (i.e., PN 7 720-7 through PN 12 720-12) and six peer nodes in Hollywood, Calif. (i.e., PN 13 720-13 through PN 18 720-18), all managed by a management server (MS) 710 in Hopkinton, Mass.

By geographically distributing the fragments, the chance of multiple fragments becoming unavailable is reduced. Further, the chance of neighboring nodes becoming unavailable is reduced. This provides a balance between increased performance provided by recovering a failed node from neighboring nodes (within the groups of six peer nodes) and increased reliability provided by the redundancy provided by the geographic distribution (i.e., only six fragments are required for reconstruction the data object).

Cross-Domain Node Roaming

In a large distributed peer-to-peer storage network, millions of nodes often will be partitioned into multiple logical storage groups based on various criteria, as described above, such as geographic location. A result of this partition schema is the limitation of load balancing that can be performed at the logical storage group level. For example, a peer storage node in one logical storage group may not be able to work with a peer storage node in another logical storage group because of a limited capability of establishing direct peer-to-peer communication channels between the two peer node belonging to different logical storage groups (i.e., domains). In other embodiments, a peer node may need to join a different logical storage group because of the failure of the management server coordinating its logical storage group.

Example embodiments of the present invention allow communications channels to be established in such a situation, thereby enabling load balancing across logical storage groups, by allowing a peer node in a first logical storage group to temporarily roam to a second logical storage group. When work loads across logical storage groups are not balanced, example embodiments of the present invention allow peer nodes from different logical storage groups to work together to balance the work load.

Figure 8:
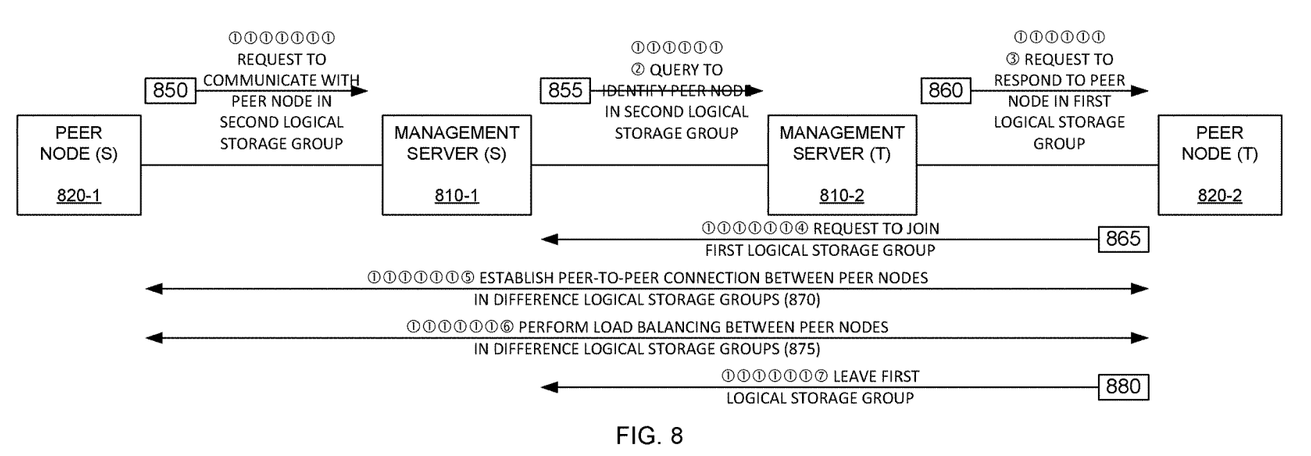
FIG. 8 is a block diagram illustrating communications between peer nodes and management servers in two logical storage groups allowing a peer node to temporarily roaming from one logical storage group (i.e., domain) to another.

FIG. 8 is a block diagram illustrating communications between peer nodes 820 and management servers 810 in two logical storage groups allowing a peer node 820-2 to temporarily roam from one logical storage group (i.e., domain) to another. In order to achieve this, a peer node from a first logical storage group (i.e., a source peer node) (Peer Node (S)) 820-1 establishes a direct peer-to-peer communication channel to facilitate that work load balancing by sending a request 850 to a first management server (i.e., a source management server) (Management Server (S)) 810-1 in a first logical storage group to communicate with another peer node in a second logical storage group. The source management server 810-1 queries a second management server (i.e., a target management server) (Management Server (T)) 810-2 managing the second logical storage group to identify a peer node from the second logical storage group (i.e., a target node) (Peer Node (T)) 820-2. The target management server 810-1 then sends a request 860 to the target peer node 820-2 requesting the target peer node 820-2 to respond to the communication request from the source peer node 820-1 (850). The target peer node 820-2 then sends a request 865 to the source management server 810-1 to temporarily join the first logical storage group.

With the target peer node 820-2 now a temporary member of the first logical storage group (i.e., domain), direct communication handshaking to establish a peer-to-peer connection (870) between the source peer node 820-1 and the target peer node 820-2 may commence. Once this direct peer-to-peer connection is established across the two logical storage groups, the source peer node 820-1 may work with the target peer node 820-2 to balance the work load across the nodes (875). After load balancing is complete, the source peer node 820-1 and the target peer node 820-2 disconnect from each other. The target peer node 820-2 sends an indication 880 that it has left the first logical storage group and returns to its normal state in the second logical storage group.

I/O Quota Management

Figure 9:
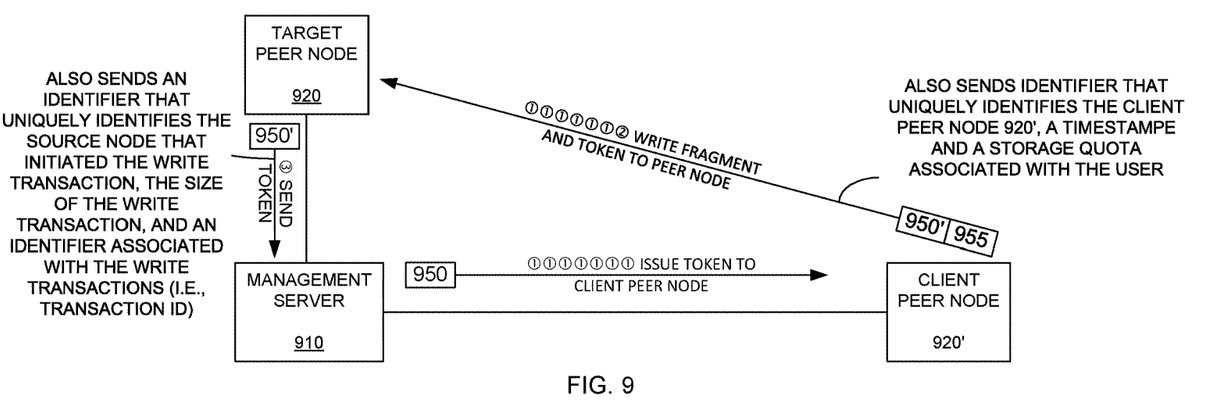
FIG. 9 is a block diagram illustrating the use of a passive token to decouple transactions between a client peer node and a target peer node and quota management operations with a management server.

In a distributed system, managing quota effectively to avoid abuse (i.e., free-ride) is quite challenging. FIG. 9 is a block diagram illustrating the use of a passive token 950 to decouple transactions between a client peer node 920' and a target peer node 920 and quota management operations with a management server 910. The approach discussed below addresses the free-ride problem in a distributed system through a passive method. In an example embodiment of the present invention, the management server 910 may issue an encrypted timed token 950 to a client peer node (i.e., a node writing to the peer nodes in a logical storage group) 920'. It should be noted that only the management server 910 can decrypt the token 950 and that the token will time out after a period of time that may be set as a parameter. Thus, the client peer node 920' will authenticate periodically with the management server to acquire a valid token. Further, it should be understood that, although only one target peer node 920 is shown for purposes of this example embodiment, there may be a plurality of target peer nodes to which a respective plurality of fragments are written.

In a preferred embodiment, the token 950 includes an identifier that uniquely identifies a user of the client peer node 920', an identifier that uniquely identifies the client peer node 920', a timestamp and a storage quota associated with the user. When the client peer node 920' user consumes a portion of its quota, the client peer node 920' writes both the fragment 955 and the token 950 to the target peer nodes.

After the write is done, one of the target peer nodes (e.g., the target peer node 920) sends the following information to the management server 910: the token 950', an identifier that uniquely identifies the source node that initiated the write transaction (i.e., source ID), the size of the write transaction, and an identifier associated with the write transaction (i.e., transaction ID). As understood in the art, the transaction ID may be used for rolling back transactions in certain circumstances. In certain embodiments, the target node can reduce the frequency of validation by sampling only small number of writes from a particular source node.

The management server then may confirm whether the token 950' is valid. If the token 950' is not valid because of mismatching source ID (i.e., the source ID in the encrypted token 950' from the target node does not match the source ID in the initially issue token 950) or if the user is invalid, the client peer node 920' identified by the target peer node 910 will be put on a black list. Further, the management server 910 will terminate the violating client peer 920' node from performing transactions.

If the token 950' is not valid because of a quota violation or a timeout, the management server 910 adds the user and the client peer node 920' to a quota violation list. A warning may be issued to the user and the client peer node 920'. After a number of warnings exceeds a defined system limit, and if the quota violation continues, the client peer node 920' will be terminated.

If the token 950' is valid, the management server 910 will update the user's quota. Accordingly, a new token issued by the management server 910 will include the new quota.

By decoupling the transaction and quota management, the system is not overburdened with consistent token checks which would lead to I/O delays because of the extremely high scale of I/O transactions in large distributed systems. Otherwise, an inordinate amount of processing power would need to be allocated for security at the risk of performance. Accordingly, the method described above balances the needs of security and performance by not only decoupling processes devoted to I/O transaction and security, but also by reducing the number of times the token is checked (i.e., although the token is submitted with every write transaction, the token is not consistently checked with each write transaction). The target peer node 920 sends the token 950' back to the management server periodically, which may be determined by a number of writes, the passage of time, or even randomly. Further, security is increased by having only one encryption/decryption point (i.e., only the management server, and not the target peer nodes 920, has access to the token content).

Figure 10:
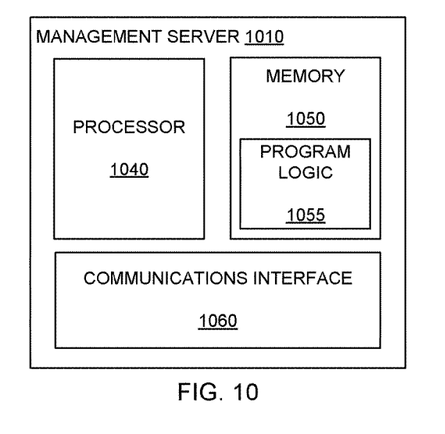
FIGS. 10 and 11 illustrate an example embodiment management server and an example embodiment peer node, respectively.
Figure 11:
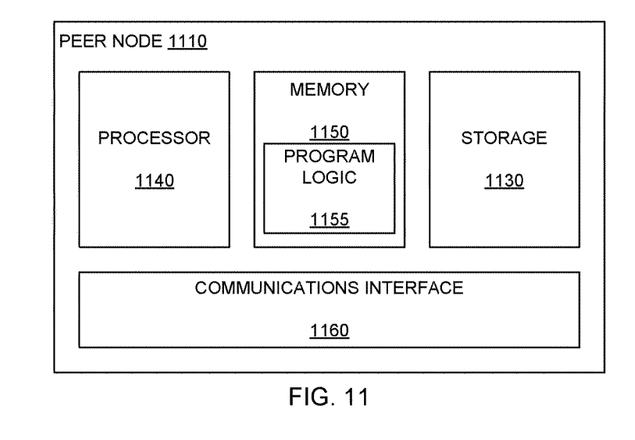

FIGS. 10 and 11 illustrate an example embodiment management server 1010 and an example embodiment peer node 1120, respectively. The management server 1010 includes a communications interface 1060, a processor 1040 and memory 1050 storing program logic 1055 for managing a data object from a client node distributively stored to a logical storage group in a network. Likewise, the peer node 1120 includes a communications interface 1160, storage 1130, a processor 1140 and memory 1150 storing program logic 1155 for distributively storing a data object at a plurality of storage nodes in a network managed by a central management server.

The methods and apparatus of this invention may take the form, at least partially, of program code (i.e., instructions) 1055, 1155 embodied in tangible non-transitory media, such as floppy diskettes, CD-ROMs, hard drives, random access or read only-memory, or any other machine-readable storage medium 1050, 1150. When the program code 1055, 1155 is loaded into and executed by a machine, such as the management server 1010 or the peer node 1120 of FIGS. 10 and 11, respectively, the machine 1010, 1120 becomes an apparatus for practicing the invention. When implemented on one or more general-purpose processors 1040, 1140, the program code 1055, 1155 combines with such a processor 1040, 1140 to provide a unique apparatus that operates analogously to specific logic circuits. As such a general purpose digital machine can be transformed into a special purpose digital machine.

Figure 12:
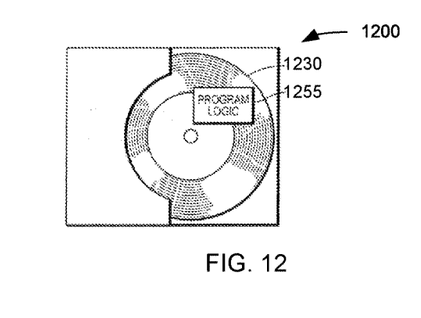
FIG. 12 is a diagram illustrating an example embodiment method of the present invention embodied as program code or a program product.

FIG. 12 shows program logic 1255 embodied on a computer-readable medium 1230 as shown, and wherein the logic is encoded in computer-executable code configured for carrying out the distributive storage process of this invention and thereby forming a computer program product 1200.

The logic for carrying out the method may be embodied as part of the aforementioned system, which is useful for carrying out a method described with reference to embodiments shown in, for example, FIGS. 1-6. For purposes of illustrating the present invention, the invention is described as embodied in a specific configuration and using special logical arrangements, but one skilled in the art will appreciate that the device is not limited to the specific configuration but rather only by the claims included with this specification.

Although the foregoing invention has been described in some detail for purposes of clarity of understanding, it will be apparent that certain changes and modifications may be practiced within the scope of the appended claims. Accordingly, the present implementations are to be considered as illustrative and not restrictive, and the invention is not to be limited to the details given herein, but may be modified within the scope and equivalents of the appended claims.

In reading the above description, persons skilled in the art will realize that there are many apparent variations that can be applied to the methods and systems described. In the foregoing specification, the invention has been described with reference to specific exemplary embodiments thereof. It will, however, be evident that various modifications and changes may be made to the specific exemplary embodiments without departing from the broader spirit and scope of the invention as set forth in the appended claims. Accordingly, the specification and drawings are to be regarded in an illustrative rather than a restrictive sense.

What is claimed is:

1. A method comprising:
    dividing, by a client node, a data object into a plurality of fragments of the data object, wherein the divided fragments comprise a plurality of chunks, with each chunk encoded by the client node as the respective plurality of fragments, and further wherein the data object is a media file;
    storing each of the divided fragments of the data object distributively upon one or more of a plurality of peer nodes on a network, whereby the stored fragments comprise a logical storage group enabling peer-to-peer distributed storage of the data object to the plurality of peer nodes;
    detecting unavailability of an unavailable peer node of the plurality of peer nodes in the network;
    selecting a new peer node to replace the unavailable peer node;
    recovering from neighboring peer nodes of the plurality of peer nodes in the network neighboring the unavailable peer node one or more of the fragments of the data object;
    recreating the data object from the recovered one or more of the fragments; and
    storing the recreated data object to the new peer node.

2. The method of claim 1 wherein the plurality of peer nodes is in a star topology with an under control of a management server over respective management server-to-peer node management paths.

3. The method of claim 2 wherein the management server is configured to establish and manage peer node-to-peer node data paths between neighboring peer nodes of the plurality of peer nodes arranged in a ring topology.

4. The method of claim 1 wherein the plurality of peer nodes comprises the logical storage group arranged in a ring topology and stores fragments of the data object using a duplication pattern.

5. The method of claim 1 wherein the client codes the fragments to the storage nodes comprising the logical storage group.

6. The method of claim 5
    wherein detecting unavailability of an unavailable peer node of a plurality of peer nodes in a network comprises detecting unavailability of a plurality of neighboring unavailable nodes of the plurality of nodes due to permanent node churn; and
    wherein recovering from neighboring peer nodes of the plurality of peer nodes in the network neighboring the unavailable peer node a fragment of a data object distributively stored to the unavailable peer node comprises recovering the fragments stored to the unavailable nodes by calculating the unavailable fragments from the original data object recreated based on a number of fragments stored to other nodes in the logical storage group according to the coding used to store the fragments to the nodes.

7. A computer program product having a non-transitory computer readable storage medium operable to store computer program logic embodied in computer program code encoded thereon for managing a data object, the computer program code comprising:
    computer program code for dividing, by a client node, a data object into a plurality of fragments of the data object, wherein the divided fragments comprise a plurality of chunks, with each chunk encoded by the client node as the respective plurality of fragments, and further wherein the data object is a media file;
    computer program code storing each of the divided fragments of the data object distributively upon one or more of a plurality of peer nodes on a network, whereby the stored fragments comprise a logical storage group enabling peer-to-peer distributed storage of the data object to the plurality of peer nodes;

computer program code for detecting unavailability of an unavailable peer node of the plurality of peer nodes in the network;

computer program code for selecting a new peer node to replace the unavailable peer node;

computer program code for recovering from neighboring peer nodes of the plurality of peer nodes in the network neighboring the unavailable peer node one or more of the fragments of the data object;

computer program code recreating the data object from the recovered one or more the fragments; and computer program code for storing the recreated data object to the new peer node.

8. The computer program product of claim 7 wherein the plurality of peer nodes is in a star topology with an under control of a management server over respective management server-to-peer node management paths.

9. The computer program product of claim 8 wherein the management server is configured to establish and manage peer node-to-peer node data paths between neighboring peer nodes of the plurality of peer nodes arranged in a ring topology.

10. The computer program product of claim 7 wherein the plurality of peer nodes comprises the logical storage group arranged in a ring topology and stores fragments of the data object using a duplication pattern.

11. The computer program product of claim 7 wherein the client codes the fragments to the storage nodes comprising the logical storage group.

12. The computer program product of claim 11
wherein computer program code for detecting unavailability of an unavailable peer node of a plurality of peer nodes in a network comprises computer program code for detecting unavailability of a plurality of neighboring unavailable nodes of the plurality of nodes due to permanent node churn; and wherein computer program code for recovering from neighboring peer nodes of the plurality of peer nodes in the network neighboring the unavailable peer node a fragment of a data object distributively stored to the unavailable peer node comprises computer program code for recovering the fragments stored to the unavailable nodes by calculating the unavailable fragments from the original data object recreated based on a number of fragments stored to other nodes in the logical storage group according to the coding used to store the fragments to the nodes.

13. A system comprising:
a plurality of peer nodes in a network having a data object distributively stored thereon as a plurality of fragments, wherein the data object is a media file;

a client node of the plurality of peer nodes configured to divide the data object into a plurality of chunks, encode each chunk as a respective plurality of fragments, and distributively store the fragments upon one or more of the plurality of peer nodes on the network, whereby the stored fragments comprises a logical storage group enabling peer-to-peer distributed storage of the data object to the plurality of peer nodes; and a management server configured to detect unavailability of an unavailable peer node of the plurality of peer nodes in the network, select a new peer node to replace the unavailable peer node, recover from neighboring peer nodes of the plurality of peer nodes in the network neighboring the unavailable peer node one or more of the fragments of the data object, recreating the data object from the recovered one or more of the fragments and store the recreated data object to the new peer node.

14. The system of claim 13 wherein the plurality of peer nodes is in a star topology with an under control of the management server over respective management server-to-peer node management paths.

15. The system of claim 14
wherein the plurality of peer nodes is arranged in a ring topology; and
wherein the management server is configured to establish and manage peer node-to-peer node data paths between neighboring peer nodes in the ring topology.

16. The system of claim 13
wherein the plurality of peer nodes comprises the logical storage group arranged in a ring topology; and
wherein the logical storage group stores fragments of the data object using a duplication pattern.

17. The system of claim 13 wherein the client is further configured to code the fragments to the storage nodes comprising the logical storage group.

18. The system of claim 17 wherein the management server is further configured to detect unavailability of a plurality of neighboring unavailable nodes of the plurality of nodes due to permanent node churn and recover the fragments stored to the unavailable nodes by calculating the unavailable fragments from the original data object recreated based on a number of fragments stored to other nodes in the logical storage group according to the coding used to store the fragments to the nodes.

19. The method of claim 1 wherein the media file is a video file.

20. The computer program product of claim 7 wherein the media file is a video file.

21. The system of claim 13 wherein the media file is a video file.

\* \* \* \* \*